W. H. NAUMAN.

SEED DRILL.

No. 9,825. Reissued Aug. 2, 1881.

Attest:
Jeremiah F. Forlig.
Gustave A. Wagner

Inventor.
Wm. H. Nauman
by Stimpson & Peck
his Attys.

N. PETERS, Photo-Lithographer, Washington, D. C.

UNITED STATES PATENT OFFICE.

WILLIAM H. NAUMAN, OF DAYTON, OHIO.

SEED-DRILL.

SPECIFICATION forming part of Reissued Letters Patent No. 9,825, dated August 2, 1881.

Original No. 89,882, dated May 11, 1869. Application for reissue filed June 7, 1881.

*To all whom it may concern:*

Be it known that I, WILLIAM H. NAUMAN, of Dayton, in the county of Montgomery and State of Ohio, have invented a new and useful Improvement in Seed-Drills; and I do hereby declare that the following is a full, clear, and exact description of my invention, reference being had to the accompanying drawings, in which—

Figure 1:
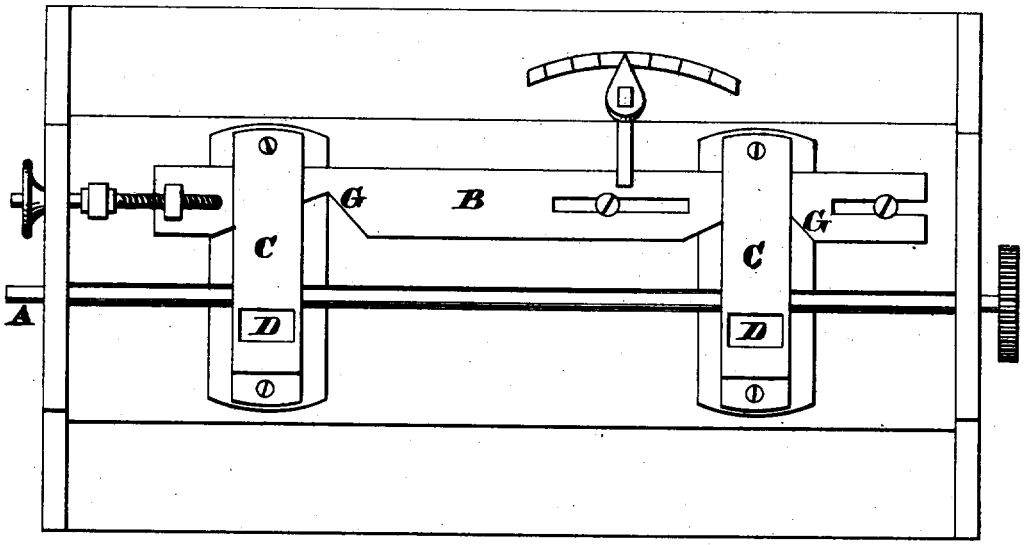
Figure 2:
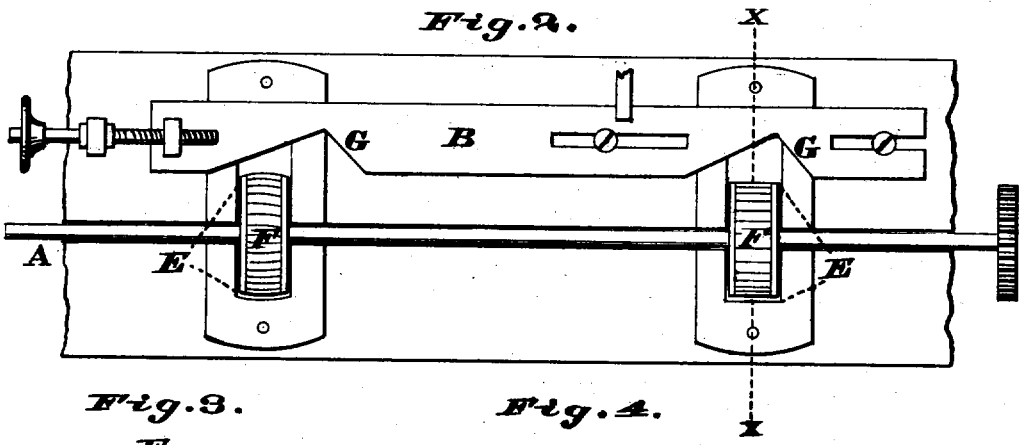
Figure 3:
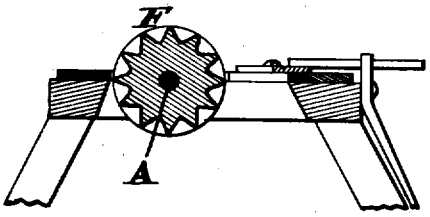
Figure 4:
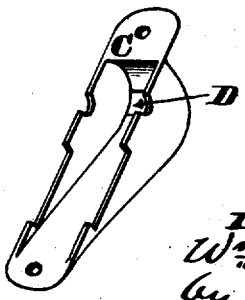

Figure 1 represents the hopper-bottom in plan view, with feed-wheels, cups, and slide attached. Fig. 2 represents the bottom of the hopper with the cups detached, but with the feed-wheels, slide, and shaft in place. Fig. 3 is an inverted end view in section through the line *x x* of Fig. 2. Fig. 4 is a perspective view of the cup detached.

My invention relates to that class of drills having a force-feed mechanism in which the feed-wheel lifts the grain up to an elevated discharge-orifice in a uniform continuous stream.

Prior to the date of my original patent the only machines having a feed of this class regulated the quantity of grain sowed or drilled either by varying the speed of the feed-wheels by means of different-sized interchangeable gears fitted upon and employed to drive the feed-shaft, or else by adjusting or sliding the feed-wheels longitudinally through the seed-cups to increase or decrease the length of the fluted or grain-carrying surface of the wheels.

The object of my invention is to provide a seed-drill that will sow grain more regularly than other drills, and that will not choke with straws or white-caps that may be in the seed, and that can be regulated to sow any quantity of seed to the acre that may be desired without increasing or diminishing the speed of the feed-wheels, thereby dispensing with a great number of gear-wheels as used by other drills which, like mine, have cups under the hopper in which the feed-wheels run.

The novelty of my invention consists in the combination, with the cups and contained feed-wheels in the force-feed mechanism of grain-drills, of a cut-off or a series of cut-offs operated simultaneously by a single movement adapted to move across the grain-channel of the cups, and to widen or narrow the same, whereby a greater or less quantity of grain is permitted to be discharged by the feed-wheels.

The feed-wheels A, which run in the cup C under the hopper-bottom and through into the hopper, are provided with flanges E on either side, and cogs F forming flutes running across and connecting with the flanges, the object of the flanges being to prevent the breaking of grain. This arrangement carries the grain through the aperture G made by the slide B in the cup C and forces it out at the discharge-opening D.

The adjustable slide B can be placed in front of the feed-wheels A, and held to its place by the cup C, and has spaces G cut out, so that in moving the slide B the aperture G between the cup and feed-wheel may be increased or diminished at pleasure, thereby leaving any desired quantity of seed through the aperture into the cup, thus avoiding the necessity of increasing or diminishing the speed of the feed-wheels, as is done by other drills having cups under the hopper in which the feed-wheel runs.

The cup C under the hopper-bottom, which covers one-half the feed-wheel, may be made large enough to pass any quantity of seed that may be desired through the adjustable channel formed by the aperture G and made by the slide B, the object of the cup being to pass either much or little seed through the discharge-opening D.

The indicator attached to the slide, as shown in Fig. 1, is for indicating the quantity of seed sown to the acre. The screw on the end of the slide is for moving the slide.

Having thus described my invention, what I claim, and desire to secure by Letters Patent, is—

1. In the force-feed mechanism of seed-drills, the combination, with the cups and contained feed-wheels, of cut-offs operated simultaneously and adapted to move across the grain-channel of the cups and to widen or narrow the same, whereby a greater or less quantity of grain is permitted to be discharged by the wheels.

2. In the force-feed mechanism of seed-drills, the combination of a vertical feed-wheel, a feed cup or case, and a feed-regulating gate or cut-off arranged to move into and across the grain-channel from one side, so as to diminish its width and decrease the discharge by holding back a portion of the grain.

3. In a force-feed seeding-machine, the combination of a feed-wheel and cup containing a grain channel or passage adjacent to said wheel, and having in cross-section substantially parallel walls, with a laterally-moving slide or gate extending across said channel to increase or diminish the transverse width of the moving stream of grain within the cup, and thereby increase or lessen the discharge.

WILLIAM H. NAUMAN.

Witnesses:

GUS. A. MEYER,

JEREMIAH F. TWOHIG.